(12) United States Patent
Chartrain et al.

(10) Patent No.: US 7,107,801 B2
(45) Date of Patent: Sep. 19, 2006

(54) ANTI-THEFT LOCKING MEANS FOR A VEHICLE STEERING SHAFT

(75) Inventors: Michel Chartrain, Lunay (FR); Arnaud Janvier, Saint Hilaire la Gravelle (FR)

(73) Assignee: Nacam France S.A., Vendome (FR)

( * ) Notice: Subject to any disclaimer, the term of this patent is extended or adjusted under 35 U.S.C. 154(b) by 0 days.

(21) Appl. No.: 10/974,947

(22) Filed: Oct. 28, 2004

(65) Prior Publication Data

US 2005/0092044 A1    May 5, 2005

(30) Foreign Application Priority Data

Nov. 5, 2003    (FR) .................................... 0312974

(51) Int. Cl.
*B60R 25/02* (2006.01)
(52) U.S. Cl. ........................... 70/185; 70/186; 464/162
(58) Field of Classification Search .......... 70/182–186, 70/252; 180/287; 280/771, 776, 89; 464/162; 192/56.1; 74/492
See application file for complete search history.

(56) References Cited

U.S. PATENT DOCUMENTS

| | | | | | |
|---|---|---|---|---|---|
| 1,363,373 | A | * | 12/1920 | Stabler ........................ | 70/252 |
| 4,570,468 | A | * | 2/1986 | Bemm et al. .................. | 70/252 |
| 4,750,380 | A | * | 6/1988 | Hoblingre et al. ............ | 74/556 |
| 4,771,618 | A | * | 9/1988 | Weber et al. .................. | 70/185 |
| 4,854,141 | A | * | 8/1989 | Haldric et al. ................. | 70/182 |
| 6,094,951 | A | * | 8/2000 | Cusati .......................... | 70/189 |
| 6,810,700 | B1 | * | 11/2004 | Okuno .......................... | 70/186 |
| 6,810,763 | B1 | * | 11/2004 | Frick et al. .................... | 74/492 |
| 2004/0020249 | A1 | * | 2/2004 | Battermann et al. ........... | 70/186 |

FOREIGN PATENT DOCUMENTS

FR        2791 023 A    9/2000

* cited by examiner

*Primary Examiner*—Lloyd A. Gali
(74) *Attorney, Agent, or Firm*—Lawrence E. Laubscher, Sr.; Lawrence E. Laubscher, Jr.

(57) ABSTRACT

An anti-theft locking device for vehicles includes an annular locking sleeve mounted concentrically about and normally in frictional engagement with the vehicle steering shaft. The locking sleeve includes a body portion having a serpentine cross-sectional configuration, thereby defining on the inner periphery of the sleeve a plurality of alternate smooth convex projections and concave valleys. The convex projections are in frictional engagement with the circumferential surface of the steering shaft by a predetermined frictional force that is greater than the rotational torque force produced during normal steering operation of the vehicle. A plurality of circumferentially spaced teeth extend radially outwardly from the locking sleeve, thereby to define between the teeth a plurality of locking slots one of which is arranged to receive the free extremity of the locking arm of a locking device.

6 Claims, 3 Drawing Sheets

ANTI-THEFT LOCKING MEANS FOR A VEHICLE STEERING SHAFT

BACKGROUND OF THE INVENTION

1. Field of the Invention

This invention relates to an anti-theft locking device adapted for mounting on the steering column of an automotive vehicle.

2. Description of the Related Art

It is well known in the patented prior art to provide a vehicle steering assembly including a steering column that is connected at one end with the vehicle steering wheel, the other end of the steering column being connected with the front steering wheels of the vehicle via steering box means.

Anti-theft locking devices have been proposed that do not include any torque limiting means, such as, for example, a locking system including a locking bolt that engages a component that is integral with the steering column. These locking systems possess the drawback of possibly being destroyed or degraded by the rupture or bending of the locking bolt, thereby producing a dangerous driving condition accompanied by untimely locking of the steering shaft as a consequence of the deformed or disintegrated parts.

There have also been proposed locking devices that include torque limiting means which permit the steering shaft to rotate upon the application of a predetermined torque force, thereby to prevent the destruction of the components of the device and to keep the parts from interfering with the normal driving of the vehicle. In this type of device, the use of a split sleeve has been proposed which is equipped with an elastic element which provides a frictional force that must be overcome to effect rotation of the steering shaft.

Also known are locking systems having a pair of elements equipped with radial teeth which are associated with an resilient element for the disengagement of the steering shaft upon the development of a certain rotational torque. It has also been proposed to use assemblies having a sleeve whose circular inside face encloses the steering shaft according to a value that allows said steering shaft to rotate when a predetermined determined torque force is exceeded.

Finally, assemblies are known having a tubular sleeve whose outer face is equipped with hollow axial deformations that are intended to receive the bolt of the locking device. Outer hollow axial deformations are provided on the inside face that are then tightened upon the steering shaft, which can thus rotate, starting as of a certain torque applied upon the steering wheel.

The different applications of this type of torque limiting system possess the drawback of employing either complex assemblies that require numerous components, thereby increasing the cost and the size of the locking system, or assemblies having a single sleeve whose torque is difficult to control or whose internal structure is tied to the external structure.

The present invention was developed to provide a rotational torque-responsive locking device on a vehicle steering column that avoids the above and other drawbacks of the prior art, and which provides a simple and rather small device that produces a precisely designed and reliable disengagement torque and that allows great flexibility of adaptation between the steering shaft and the engagement of the locking arm of a locking device.

BRIEF SUMMARY OF THE INVENTION

Accordingly, a primary object of the present invention is to provide a locking device that includes an annular locking sleeve arranged concentrically about the smooth outer circumferential surface of the steering shaft, which sleeve has a serpentine cross-sectional configuration, thereby to define successive smooth convex projections and concave valleys on the inner and outer peripheries of the sleeve. The sleeve is normally non-rotatably connected with the steering shaft owing to the provision of a predetermined frictional force between the inner convex projections on the sleeve and the circumferential surface of the steering shaft. When the locking sleeve is prevented from rotation by the insertion of a stationary locking arm into a locking slot on the outer periphery of the sleeve, upon overload the predetermined frictional force is overcome, thereby permitting the steering shaft to rotate relative to the sleeve, so that deformation and/or destruction of the components is avoided.

According to a more specific object of the present invention, the rotational torque limiting locking device of a steering column on an automotive vehicle comprises a steering shaft on which is concentrically arranged a sleeve that cooperates with the bolt of a locking device constituting an antitheft device for said vehicle and whose inside face cooperates with said steering shaft in order to bring about the torque limiting force. The sleeve consists of a tubular body portion having a serpentine cross-sectional configuration with a generally constant thickness throughout, thereby to define successive convex projections and concave valleys on the inner and outer peripheries of the sleeve. Radially extending teeth are arranged on the exterior convex projections at an equal distance from each other so as to define between pairs of contiguous teeth a radial slot adapted to receive the locking arm, thereby to lock the steering column in a desired angular position.

The sleeve is fixed on the steering shaft by means of a predetermined frictional force developed between the protruding convex portions on the interior surface of the locking sleeve and the outer circumferential surface of the steering shaft, said frictional force being greater than the maximum torque applied to the steering shaft during routine driving conditions.

The transverse angular position of the teeth is independent of the transverse angular position of the radial interior convex projections, thereby to permit one to precisely adapt a number of interior convex shapes to the maximum torque to be transmitted, and so as to be able exactly to adapt the number and the transverse shape of the radial teeth to the automotive vehicle concerned.

According to one particularly interesting embodiment of the invention, the pitch of the teeth is twice the pitch of the radial interior convex projections.

To provide a better frictional connection of the sleeve in response to the various stresses, the two side walls of each radial locking slot are generally parallel. Moreover, each of the two faces of each radial slot is connected with the corresponding exterior surface of the sleeve body portion by a rounded face.

According to one embodiment of the invention, the sleeve is provided with radial slots that extend axially the length of the sleeve. In another embodiment, the sleeve of the locking device is provided with radial slots that extend axially from one end of the sleeve only partly the length of the sleeve, thereby to define an annular flange portion at the other end of the sleeve.

The rotational torque-limiting locking device according to the present invention provides the advantage of a particularly simple assembly with a single sleeve. Moreover, it is possible to adapt that sleeve to various types of vehicles, since the position of the serpentine undulations is independent of the position of the axial slot that receives the locking arm of the locking device. Finally, the design of the annular sleeve with serpentine undulations makes it possible in a precise fashion to provide the desired precise value of the rotational torque force at which the shaft with the steering wheel turns with respect to the sleeve.

BRIEF DESCRIPTION OF THE DRAWINGS

Other objects and advantages of the invention will become apparent from a study of the following specification when viewed in the light of the accompanying drawings, in which.

DETAILED DESCRIPTION OF THE INVENTION

According to the present invention, a rotary torque limiting locking device is provided for use on the steering column of an automotive vehicle. The steering column comprises a steering shaft 1 connected at one end to the steering wheel 30 and at the other end to a steering box 32 that controls the front steering wheels of the vehicle.

Figure 1:
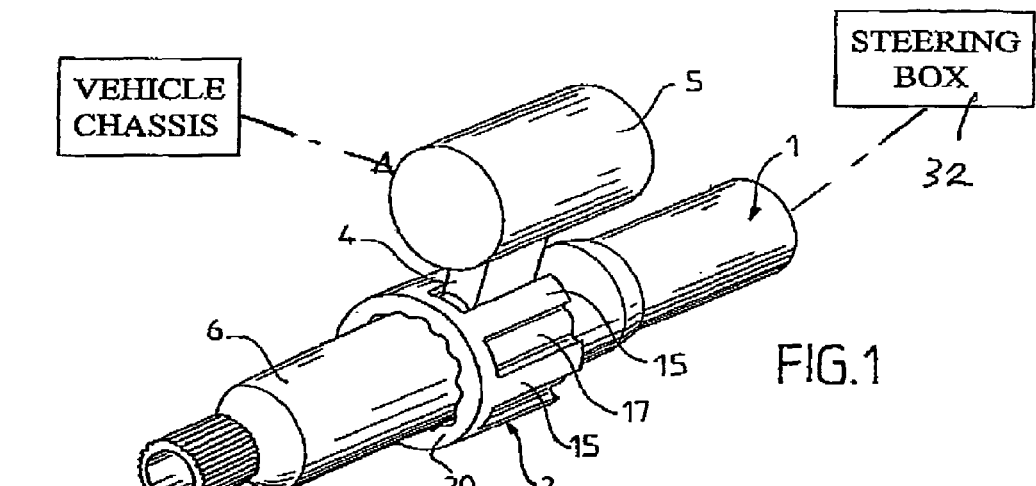
FIG. 1 is a perspective view of the steering shaft locking assembly of the present invention.
Figure 2:
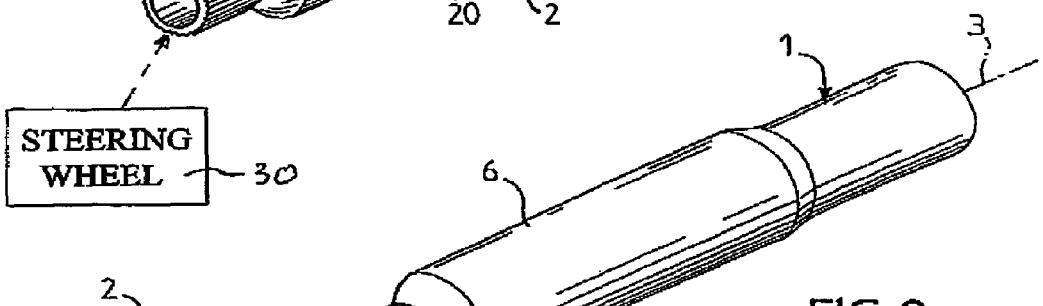
FIG. 2 is an exploded perspective view of the steering shaft and locking sleeve of FIG. 1.
Figure 3:
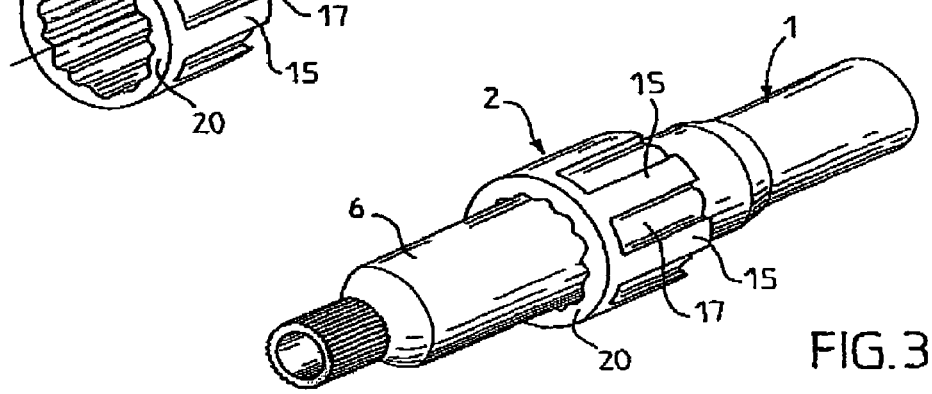
FIG. 3 is a perspective view illustrating the locking sleeve mounted on the steering shaft.

As shown in FIGS. 1–3, an annular locking sleeve 2 is mounted concentrically about the smooth cylindrical circumferential portion of the steering shaft 1. As will be described in greater detail below, locking sleeve 2 is adapted to cooperate with the locking arm 4 of a locking lock 5, which constitutes the antitheft device of the vehicle.

More particularly, locking sleeve 2 is mounted on a circular portion 6 of steering shaft 1 which rotates about the steering axis 3.

As shown in detail in FIGS. 4–7, locking sleeve 2 consists essentially of a tubular body portion 20 having an outer periphery 22 from which extend a plurality of radial teeth 15 which are spaced to define a plurality of locking slots 17 which are adapted to receive the free end of the locking arm 4 of the locking device 5.

Figure 7:
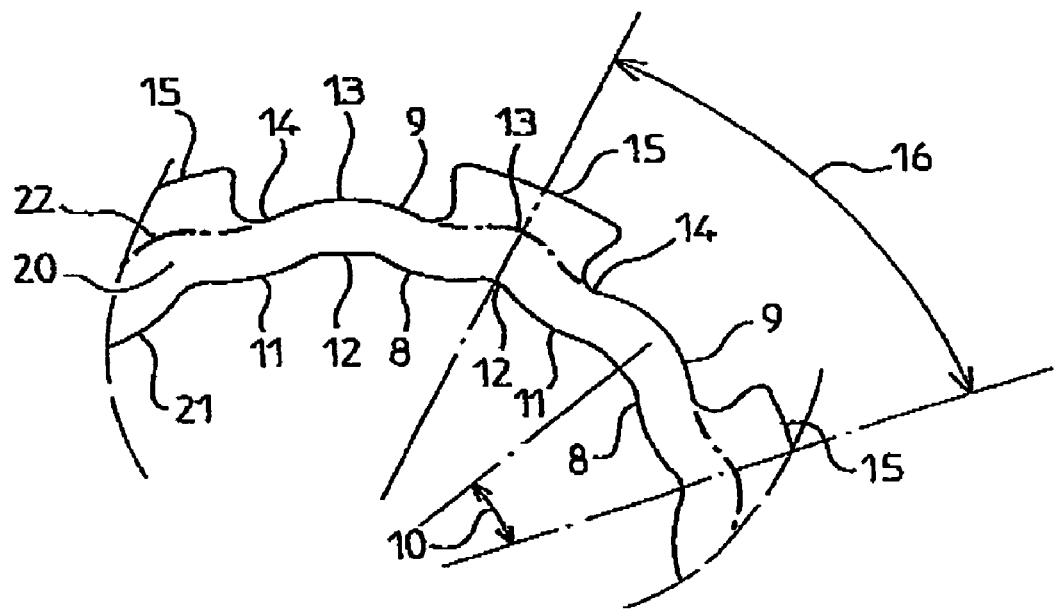
FIG. 7 is a detailed view of the locking sleeve of FIG. 6.

In accordance with a characterizing feature of the invention, the tubular body portion 20 of the locking sleeve has a serpentine cross-sectional configuration of constant thickness, as represented by the dot-and-dash lines in FIG. 7 in the region of each axial tooth 15. The serpentine undulations 7 of the sleeve body portion 20 define on the inner periphery of the sleeve an alternate succession of smooth convex projections 11 and concave valleys 12, and to define on the outer periphery an alternate succession of smooth convex projections 13 and valleys 14. The axial teeth 15 are arranged on the exterior periphery of the sleeve at equally spaced distances so as to obtain between each of two contiguous axial teeth 15 a radial slot 17 that can receive the free extremity of the locking arm 4 so as to lock the steering column in an angular position.

Figure 6:
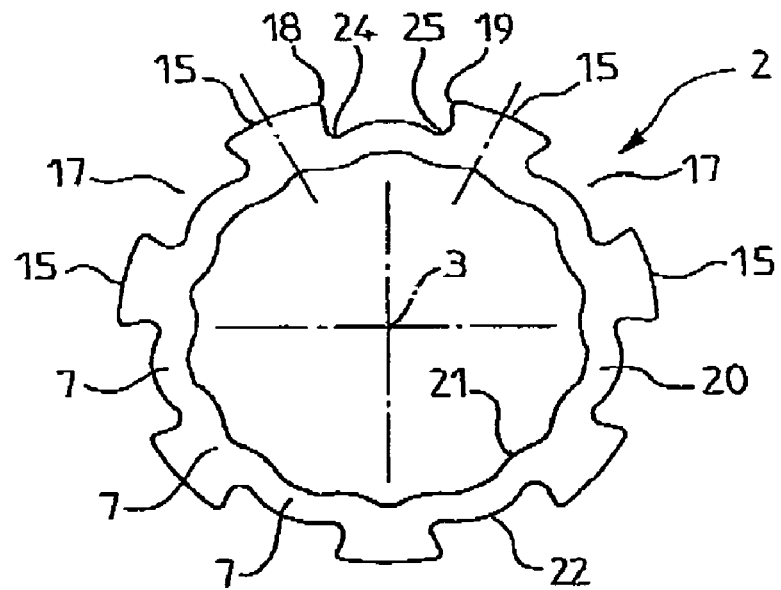
FIG. 6 is an end view of the locking sleeve of FIG. 5.

Each radial slot 17 has two side wall faces 18 and 19, which are generally essentially parallel. Moreover, each of the two faces 18 and 19 is connected with the corresponding outer peripheral surface 9 of the body portion by rounded merging faces 24 and 25, as best shown in FIG. 6.

The cylindrical circumferential surface 6 of the steering shaft 1 and the convex protruding portions 11 of the undulating inner surface 8 of the body portion of the sleeve are specifically designed to cooperate to produce a predetermined frictional force that is greater than the normal rotational torque produced during normal driving conditions of the vehicle. More particularly, the dimensions, composition and the characteristics of sleeve 2 and of circular portion 6 are so designed that the frictional force has a predetermined value that is greater than the maximum torque applied upon steering shaft 1 during normal driving conditions.

Figure 5:
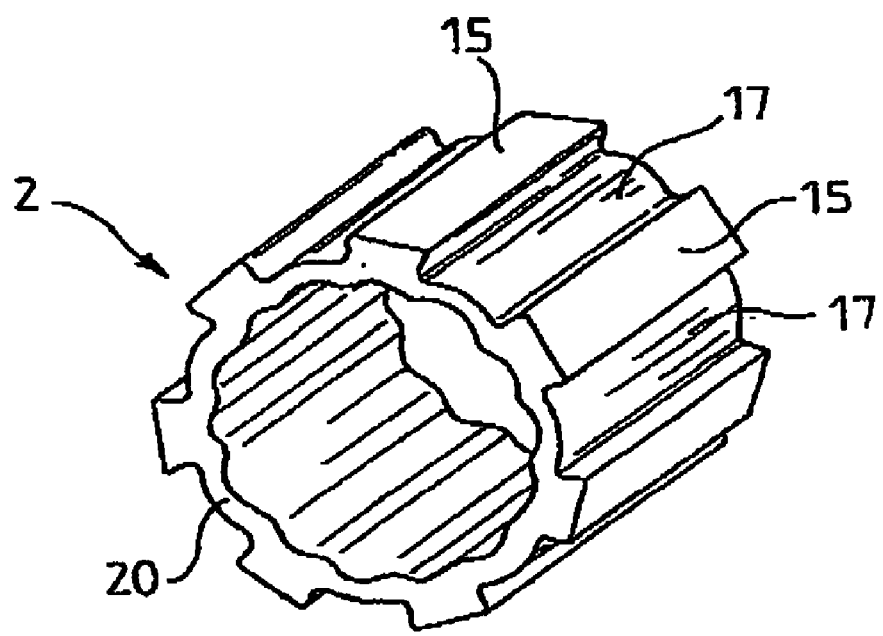
FIG. 5 is a similar perspective view of another embodiment of the locking sleeve.

In the sleeve embodiment shown in FIG. 5, the radial slots 17 have a continuous configuration in the axial direction throughout the length of the sleeve 2.

In the sleeve embodiment of FIGS. 1–4, the radial slots 17 extend from one end of the sleeve and terminate short of the other end of the sleeve, thereby to define a flange 23 at the other end of said sleeve.

One advantage of the present invention is that the position of the axial teeth 15 is independent with respect to the serpentine undulations 7. Because of this, the teeth can be arranged at any position and can be adapted precisely to the architecture of the associated automotive vehicle.

Figure 4:
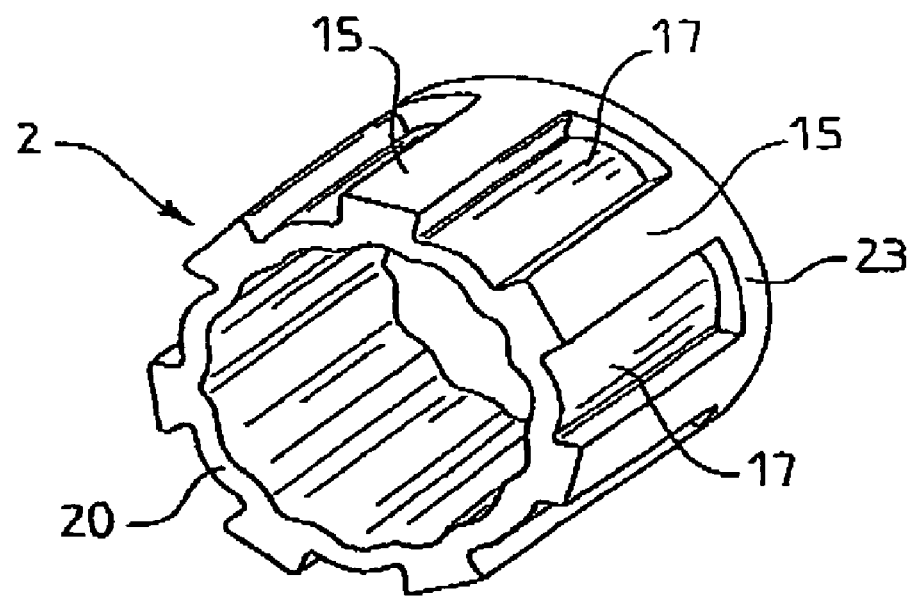
FIG. 4 is a front perspective view of the locking sleeve of FIGS. 1–3.

In the embodiments of sleeve 2 shown in FIGS. 4 and 5, the layout is characterized in that the angular pitch 16 of the radial teeth 15 is twice the angular pitch 10 of the interior convex projections 11. Moreover, the end surfaces of the teeth 15 and the ends of the convex projections 13 are coplanar.

Thus, the present invention relates to a locking system which is intended to disturb the rotation of the steering column of a vehicle by the steering wheel for the purpose of preventing the theft of the vehicle.

This device offers the particular feature and advantage of having only two elements, contrary to most of the existing system, which employ at least three elements. During normal driving conditions, the predetermined frictional force between the sleeve and the steering shaft makes it possible to insure a positive connection between steering shaft 1 and sleeve 2.

Sleeve 2 is specifically designed so that the protruding inner projections 11 are arranged opposite the concave portions 14 of the exterior surface 22 of the sleeve body portion 20. This original structure makes it possible for sleeve 2 to be deformed elastically and plastically so as to maintain a perfectly controlled frictional force upon steering shaft 1. Thus, any rotational torque applied upon the steering shaft by the steering wheel is integrally transmitted to sleeve 2 by means of the tightening under pressure, which is tied to the elastic and plastic deformation of sleeve 2. This tightening brings about an angular mechanical locking of the steering column when locking arm 4 of the antitheft device is engaged in one of the axial notches 17 of sleeve 2. However, due to the action of a rotational torque whose value is greater than the controlled predetermined value, the overload effort provided by the steering wheel manages to overcome the contact pressure between sleeve 2 and steering shaft 1, which can then rotate with respect to sleeve 2 into a locked position. There is then no more purely mechanical link between these two elements as long as the overload rotational torque is maintained on the steering wheel. As a result, it becomes impossible to drive the vehicle because one cannot master the driving of the vehicle while maintaining a major and continuous overload effort level upon the steering wheel. Thus, when the rotational torque applied upon the steering wheel is relaxed or when it falls below a certain level, the link between steering shaft 1 and sleeve 2 again becomes mechanically rigid.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. Anti-theft locking means for locking the steering column relative to the chassis of an automotive vehicle, said steering column being subjected to a given first rotational torque during normal steering operation of the vehicle, comprising:
   (a) a steering shaft having a smooth cylindrical circumferential surface;
   (b) an annular locking sleeve mounted concentrically about said steering shaft circumferential surface, said locking sleeve including:
      (1) an annular body portion having a serpentine cross-sectional configuration of generally uniform thickness, thereby to define on each of the inner and outer peripheries of said body portion a plurality of alternate smooth convex projections and concave valleys, respectively, the inner convex projections on the inner periphery of said sleeve being in frictional engagement with the circumferential surface of said steering shaft with a predetermined frictional force that is greater than the corresponding force produced by said first rotational steering torque; and
      (2) a plurality of circumferentially spaced teeth extending radially outwardly from the outer periphery of said locking sleeve from alternate ones of the outer convex projections on said outer periphery of said sleeve, said teeth defining therebetween a plurality of radial locking slots; and
   (c) locking means operable to lock said locking sleeve to the vehicle chassis, said locking means including:
      (1) a locking body adapted for engagement with the vehicle chassis; and
      (2) an arm portion extending from said locking body into locking engagement with one of said slots, thereby to lock said sleeve against rotation relative to the vehicle chassis.

2. Anti-theft locking means as defined in claim 1, wherein each of said teeth has a cross-sectional configuration such that the adjacent side walls of successive teeth are generally parallel.

3. Anti-theft locking means as defined in claim 2, wherein each side wall of each of said teeth is connected with the adjacent portion of the outer periphery of the sleeve body portion by a curved merging surface.

4. Anti-theft locking means as defined in claim 1, wherein each of said slots extends the length of said locking sleeve.

5. Anti-theft locking means as defined in claim 1, wherein each of said slots extends from one end of said sleeve toward, and terminates short of, the other end of said sleeve, thereby to define a continuous annular flange adjacent said sleeve other end.

6. Anti-theft locking means as defined in claim 1, wherein said predetermined frictional force produced by said inner convex projections has such a value that it is overcome upon the application of a second rotational torque to said steering shaft that is greater than said first rotational torque.

* * * * *